United States Patent
Jindal et al.

(10) Patent No.: US 6,327,622 B1
(45) Date of Patent: *Dec. 4, 2001

(54) LOAD BALANCING IN A NETWORK ENVIRONMENT

(75) Inventors: Anita Jindal; Swee Boon Lim, both of Cupertino; Sanjay Radia, Fremont; Whei-Ling Chang, Saratoga, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/146,772

(22) Filed: Sep. 3, 1998

(51) Int. Cl.$^7$ .............................. G06F 15/16; G06F 9/00
(52) U.S. Cl. ........................... 709/228; 709/105; 712/27
(58) Field of Search .................................. 709/223, 244, 709/238, 232, 105, 102, 228; 370/232; 712/27

(56) References Cited

U.S. PATENT DOCUMENTS

| | | | |
|---|---|---|---|
| 5,371,852 | 12/1994 | Attanasio et al. | 395/200 |
| 5,392,429 | * 2/1995 | Agrawal et al. | 708/446 |
| 5,459,837 | 10/1995 | Caccavale | 395/184.01 |

(List continued on next page.)

FOREIGN PATENT DOCUMENTS

| | | | |
|---|---|---|---|
| 0715257 A1 | 6/1996 | (EP) | G06F/9/46 |
| WO 98/26559 | 6/1998 | (WO) | H04L/29/12 |

OTHER PUBLICATIONS

Pending U.S. Patent Application Ser. No. 09/146,848, by Anita Jindal, et al., titled "Load Balancing for Replicated Services," filed Sep. 3, 1998, with Attorney Docket No. SUN–P3316–JTF.

Pending U.S. Patent Application Ser. No. 09/146,771, Anita Jindal, et al., titled "System for Responding to a Resource Request," filed Sep. 3, 1998, with Attorney Docket No. SUN–P3317–JTF.

Colajanni, M., Yu, P. and Dias, D., *Analysis of Task Assignment Policies in Scalable Distributed Web–Server Systems*, IEEE Transactions on Parallel and Distributed Systems, vol. 9, No. 6, Jun. 1998, pp. 585–599.

*Primary Examiner*—Zarni Maung
*Assistant Examiner*—Jason D. Cardone
(74) *Attorney, Agent, or Firm*—Park, Vaughan & Fleming LLP (57) ABSTRACT

A method is provided for load balancing requests for an application among a plurality of instances of the application operating on a plurality of servers. A policy is selected for choosing a preferred server from the plurality of servers according to a specified status or operational characteristic of the application instances, such as the least-loaded instance or the instance with the fastest response time. The policy is encapsulated within multiple levels of objects or modules that are distributed among the servers offering the application and a central server that receives requests for the application. A first type of object, a status object, gathers or retrieves application-specific information concerning the specified status or operational characteristic of an instance of the application. Status objects interact with instances of the load-balanced application and are configured to store their collected information for retrieval by individual server monitor objects. An individual server monitor object illustratively operates for each server operating an instance of the application and retrieves the application-specific information from one or more status objects. A central replicated monitor object gathers the information from the individual server monitor objects. The information is then analyzed to select the server having the optimal status or operational characteristic. An update object updates the central server, such as a domain name server, to indicate the preferred server. Requests for the application are then directed to the preferred server until a different preferred server is identified.

39 Claims, 5 Drawing Sheets

U.S. PATENT DOCUMENTS

| | | | | |
|---|---|---|---|---|
| 5,583,994 | | 12/1996 | Rangan | 395/200 |
| 5,742,598 | | 4/1998 | Dunn et al. | 370/393 |
| 5,774,660 | * | 6/1998 | Brendel et al. | 709/201 |
| 5,774,668 | * | 6/1998 | Choquier et al. | 709/223 |
| 5,790,789 | | 8/1998 | Suarez | 395/200.32 |
| 5,848,241 | * | 12/1998 | Misinai et al. | 709/213 |
| 5,870,561 | * | 2/1999 | Jarvis et al. | 709/238 |
| 5,881,238 | | 3/1999 | Aman et al. | 395/200 |
| 5,894,556 | | 4/1999 | Grimm et al. | 395/200 |
| 5,915,095 | * | 6/1999 | Miskowiec | 709/223 |
| 5,931,900 | * | 8/1999 | Notani et al. | 709/201 |
| 5,937,165 | | 8/1999 | Schwaller et al. | 395/200 |
| 5,938,732 | | 8/1999 | Lim et al. | 709/229 |
| 5,966,695 | * | 10/1999 | Melchione et al. | 705/10 |
| 5,991,809 | * | 11/1999 | Kriegsman | 709/226 |
| 5,991,878 | * | 11/1999 | McDonough et al. | 713/200 |
| 6,038,599 | | 3/2000 | Black et al. | 709/223 |
| 6,052,718 | * | 4/2000 | Gifford | 709/219 |
| 6,092,178 | * | 7/2000 | Jindal et al. | 712/27 |

* cited by examiner

LOAD BALANCING IN A NETWORK ENVIRONMENT

U.S. Pat. No. 6,092,178, entitled "Systems for Responding to a Resource Request," and U.S. patent application Ser. No. 09/146,848, entitled "Load Balancing for Replicated Services," both of which were filed on Sep. 3, 1998, are related to the present application.

BACKGROUND

This invention relates to the field of computer systems. More particularly, a system and methods are provided for load balancing among application programs or replicated services.

In many computing environments, clients (e.g., computer systems and users) connect to servers offering a desired application or service—such as electronic mail or Internet browsing. One computer server may, however, only be capable of efficiently satisfying the needs of a limited number of clients. In such a case, an organization may employ multiple servers offering the same application or service, in which case the client may be connected to any of the multiple servers in order to satisfy the client's request.

A service offered simultaneously on multiple servers is often termed "replicated" in recognition of the fact that each instance of the service operates in substantially the same manner and provides substantially the same functionality as the others. The multiple servers may, however, be situated in various locations and serve different clients. Application programs may also operate simultaneously on multiple servers, with each instance of an application operating independently of, or in concert with, the others. In order to make effective use of an application or replicated service offered by multiple servers (e.g., to satisfy clients' requests), there must be a method of distributing clients' requests among the servers and/or among the instances of the application or service. This process is often known as load balancing. Methods of load balancing among instances of a replicated service have been developed, but are unsatisfactory for various reasons.

In one method of load balancing a replicated service, clients' requests are assigned to the servers offering the service on a round-robin basis. In other words, client requests are routed to the servers in a rotational order. Each instance of the replicated service may thus receive substantially the same number of requests as the other instances. Unfortunately, this scheme can be very inefficient.

Because the servers that offer the replicated service may be geographically distributed, a client's request may be routed to a relatively distant server, thus increasing the transmission time and cost incurred in submitting the request and receiving a response. In addition, the processing power of the servers may vary widely. One server may, for example, be capable of handling a larger number of requests or be able to process requests faster than another server. As a result, a more powerful server may periodically be idle while a slower server is over-burdened.

In another method of load balancing, specialized hardware is employed to store information concerning the servers hosting instances of a replicated service. In particular, according to this method information is stored on a computer system other than the system that initially receives clients' requests. The stored information helps identify the server having the smallest load (e.g., fewest client requests). Based on that information, a user's request is routed to the least-loaded server. In a web-browsing environment, for example, when a user's service access request (e.g., a connection request to a particular Uniform Resource Locator (URL) or virtual server name) is received by a server offering Domain Name Services (DNS), the DNS server queries or passes the request to the specialized hardware. Based on the stored information, the user's request is then forwarded to the least-loaded server offering the requested service.

This method is also inefficient because it delays and adds a level of complexity to satisfying access requests. In particular, one purpose of a DNS server is to quickly resolve a client's request for a particular service to a specific server (e.g., a specific network address) offering an instance of the service. Requiring the DNS server to query or access another server in order to resolve the request is inefficient and delays the satisfaction of the request.

In yet other methods of balancing requests among multiple instances of a replicated service, client requests are randomly assigned to a server or are assigned to the closest server. Random assignment of client requests suffers the same disadvantages as a round-robin scheme, often causing requests to be routed to geographically distant servers and/or servers that are more burdened than others. This naturally results in unnecessary delay. Simply assigning requests to the closest server may also be inefficient because a faster response may be available from a server that, although further from the client, has less of a load.

As mentioned above, present load balancing techniques are also limited in scope. For example, the techniques described above are designed for replicated services only and, in addition, only consider the operational status or characteristics of the servers hosting the replicated service, not the service itself. In other words, present techniques do not allow load balancing among instances of an application program or, more generally, the collection or consideration of information concerning the status of individual instances of applications or services executing on multiple servers.

SUMMARY

In one embodiment of the invention a system and methods are provided for balancing client (e.g., user) requests among multiple instances of an application (e.g., application program or replicated service) in accordance with a selected policy. In this embodiment, each instance of the load-balanced application executes on a separate computer server.

A load balancing policy is selected for distributing the client requests among the multiple servers and instances of the application and, at periodic intervals, a "preferred" server is identified in accordance with the policy. Illustratively, the selected policy reflects or specifies one or more application-specific factors or characteristics to be considered in choosing the preferred server. Client requests are routed to the preferred server until such time as a different server is preferred. A selected load balancing policy may be replaced while the application continues operating.

Other exemplary policies reflect preferences for the least-loaded instance of the application or the instance having the fastest response time. The least-loaded instance may be that which has the fewest connected clients and/or the fewest pending client requests. In another policy, where the closest instance of the application is favored, the preferred server may be the server that can be reached in the fewest network hops or connections. Another illustrative policy favors the server and/or the instance with the greatest throughput (e.g., the highest number of client requests satisfied in a given time period).

Depending upon the selected policy, status objects (e.g., agents, modules or other series of executable instructions) are configured to collect these various pieces of information from each instance of the application that is being load-balanced (and/or its server). Status objects in one embodiment of the invention thus retrieve application-specific information (e.g., number and/or type of pending client requests) and/or information concerning a server's general status (e.g., its distance from another network entity). Illustratively, each instance of a load-balanced application is associated with its own status object(s). In one embodiment of the invention multiple status objects having different functions are associated with one instance.

Each instance of the application (or, alternatively, each server hosting an instance of the application) is also associated with an individual monitor object or IMO (e.g., another object, module or series of executable instructions). Each IMO invokes and stores information from one or more status object(s) collecting information concerning an instance of the application. In one embodiment of the invention each IMO is configured to interact with a single status object; in an alternative embodiment multiple status objects are associated with an IMO. In addition, in one embodiment of the invention an IMO interfaces directly with its status object(s); in another embodiment each status object stores its application-specific information for retrieval by the IMO.

A replicated monitor object (RMO) or module is employed to collect information from the IMOs associated with the various instances of the load-balanced application. The RMO stores this information, which is then analyzed to identify a preferred server in accordance with the selected policy.

In an embodiment of the invention in which clients access the application through a central server such as a Domain Name Services (DNS) server, a specialized updater object updates a lookup table (e.g., a DNS zone file) to identify the preferred server (e.g., by its network address or an alias). In this embodiment the lookup table is used to resolve a virtual server name (e.g., a virtual identity of the application) to a particular server offering an instance of the application. When a client requests an application via a virtual name, the central server directs the request to the server indicated in the lookup table (i.e., the preferred server). The specialized object is thus configured to update the lookup table (or other data structure) or otherwise cause the direction or re-direction of load-balanced requests to the preferred server.

In one embodiment of the invention the status object(s) and an IMO execute on each individual server hosting an instance of the load-balanced application, while the RMO and updater objects operate on a central server. In an alternative embodiment, only the status object(s) execute on the individual servers with the application instances. The other objects are distributed among the central server and other intermediate servers.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, illustrative embodiments of the invention are described in the context of applications such as a database management system (DBMS), electronic mail, or web browsing. Various embodiments of the invention may therefore involve the use of a central server, such as a Domain Name Services (DNS) server, to resolve an access request for an application into an address of a physical machine such as a computer server. One skilled in the art will recognize that the present invention is not limited to the applications described herein or the use of a DNS server, and may be readily adapted to other applications and services for which load balancing is appropriate.

Illustratively, the program environment in which a present embodiment of the invention is executed incorporates a general-purpose computer or a special purpose device such a hand-held computer. Details of such devices (e.g., processor, memory, data storage and display) are well known and are omitted for the sake of clarity.

It should also be understood that the techniques of the present invention might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. In addition, although specific embodiments of the invention are described using object-oriented software programming concepts, the invention is not so limited and is easily adapted to employ other forms of directing the operation of a computer.

In a present embodiment of the invention, information concerning instances of an application (e.g., an application program or replicated service) operating on multiple computer servers is collected and analyzed to identify a "preferred" server. Illustratively, a preferred server is the server to which client requests for the application are to be routed for processing. A preferred server is identified on a regular or periodic basis, and may be the same as or different from the server previously identified. By periodically changing the preferred server, client requests are load-balanced between the participating servers. Individual clients may thus be routed to, and their requests (e.g., database access, send electronic mail, browse a web page) satisfied by, any of the multiple servers.

The information that may be collected concerning an instance of the program illustratively includes its response time for a client request, its operational status (e.g., whether it is up or down), the number of clients connected to the instance, the number of client requests pending with the instance, its throughput (e.g., number of client requests handled in a period of time), etc. Information concerning the status or performance of the host servers themselves (e.g., load, capacity, distance from a central server) may also be collected and analyzed as part of the process of choosing a preferred server.

Illustratively, a central server that distributes client requests for the application among the various instances uses a lookup table or other data structure or means to store an identifier of the current preferred server. The central server is, in one embodiment of the invention, a Domain Name Services (DNS) server. In this embodiment, the application is exposed (e.g., identified) as a virtual server name to which clients connect and which the DNS resolves to an address of one of the multiple servers operating an instance of the application.

The specific information that is collected (from the various application instances and, possibly, the host servers) is determined by a load balancing policy that may be selected by a system manager or administrator. The preferred server is then selected by analyzing the collected information. Thus, in one illustrative policy, the preferred server is the server offering the application instance that is least-loaded (e.g., has the fewest pending client requests or fewest connected clients). In another illustrative policy, the preferred server is the server closest to the central server.

In this embodiment the various pieces of information are collected and assembled on the central server. After a preferred server is identified, the central server's lookup table is updated with an identifier (e.g., a network address) of the preferred server and subsequent requests for the application or replicated service are directed to that server. For example, in a web-browsing environment a DNS zone file is updated to indicate that requests for the Internet service or web page are to be routed to the preferred server.

In one embodiment of the invention a standard application programming interface (API) is provided to construct and apply the load balancing framework described below. With the standard API, a programmer may generate application-specific status objects (described in detail below in conjunction with FIG. 2) which, when executed, gather the information described above. The application-specific status objects may, in addition, interact with the application in accordance with an application-specific API.

Generating application-specific status objects or modules illustratively allows the collection of any information that could form the basis for load balancing client requests. For example, to load-balance a database application, it may be desirable to determine the number of users being serviced by each instance of the application, the number of users that have accessed an instance, or the number of access requests that are pending with or that have been processed by each instance. The information gathered by the application-specific status objects is used by other objects and/or modules in the load-balancing framework in order to determine a preferred server.

Figure 1:
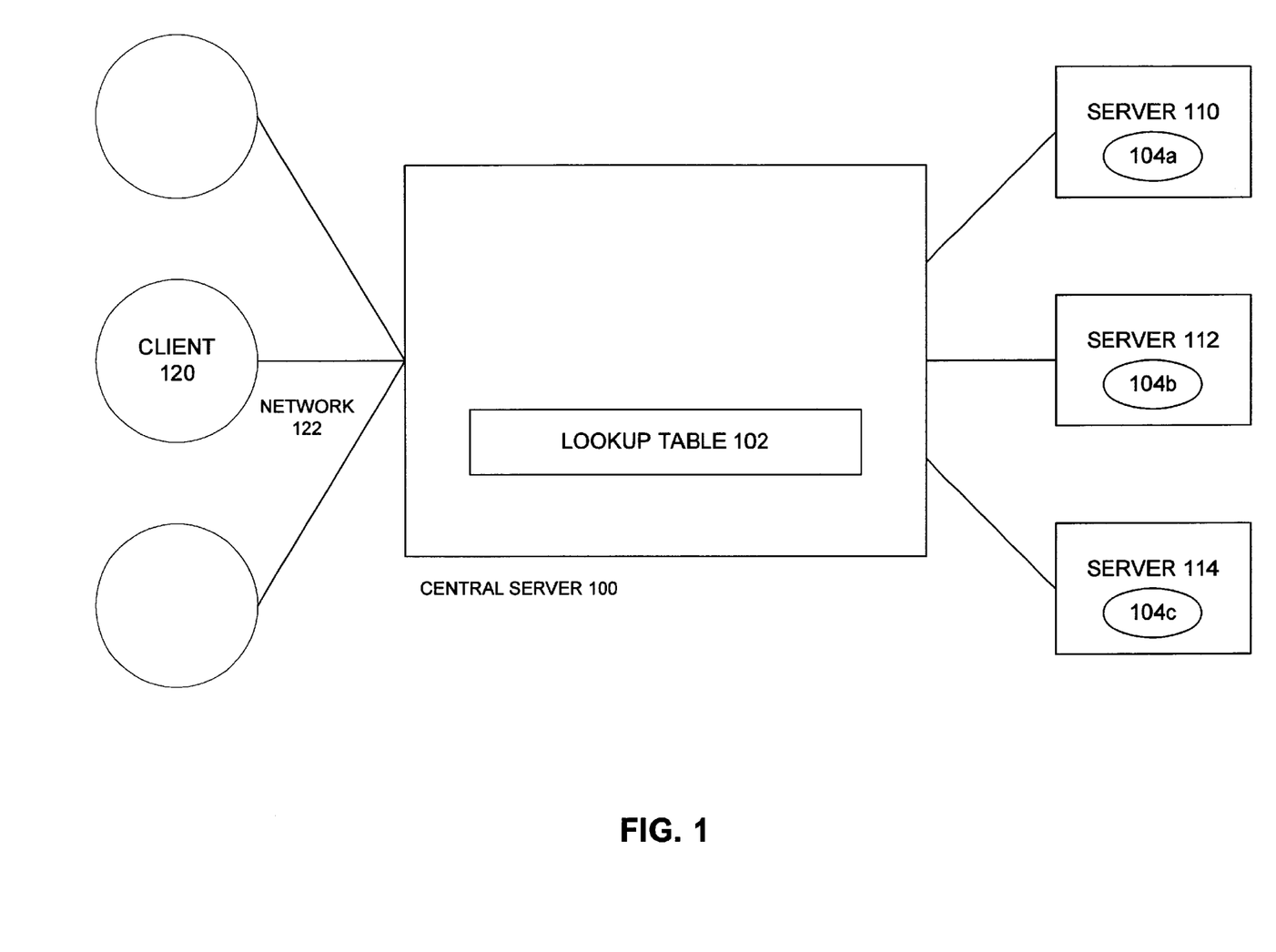
FIG. 1 is a block diagram depicting an illustrative environment in which an embodiment of the present invention may be implemented to load balance client requests among multiple instances of an application.

FIG. 1 is a block diagram depicting an illustrative environment in which an embodiment of the invention may be implemented to balance client requests among multiple instances of an application executing on multiple servers. In the embodiment central server 100 is a computer system that receives information from the various application instances (and possibly the servers hosting the application instances) and routes requests from clients such as client 120 to a preferred server. In one embodiment of the invention, central server 100 is a DNS server. Back-end or host servers 110, 112 and 114 each offer one or more instances of application 104, represented by the numerals 104a, 104b and 104c. Servers 110, 112 and 114 may be geographically or logically separated from one another.

Central server 100 includes lookup table 102 for resolving requests for application program 104 to an address of a server offering an instance of the program. Lookup table 102 thus includes an entry for the program's identity as exposed to clients (e.g., an alias or a virtual server name), to allow the clients to access an instance of the application on server 110, server 112 or server 114. Thus, the lookup table entry for application 104 may indicate a network address (e.g., an IP or Internet protocol address) for one of servers 110, 112 and 114.

In the embodiment client 120 is illustratively a personal computer or workstation configured to provide a user access to a network (e.g., the Internet) and various applications and services on servers 110, 112 and 114. Client 120 is thus coupled to central server 100 via network 122, and includes instructions (e.g., a web browser) for communicating via network 122. Client 120 further includes common components such as a processor, memory, storage, input and output devices, etc. Such common components are well known to those skilled in the art and are omitted from FIG. 1 for the purpose of clarity.

In the environment of FIG. 1, when client 120 attempts to connect to application 104, the access request is received by central server 100. Central server 100, through lookup table 102, identifies a preferred server offering an instance of program 104 and routes the client request accordingly. The server identified in lookup table 102 may be determined according to a load-balancing policy, as discussed below. Further, the server identified in lookup table 102 is updated or changed from time to time in accordance with the selected policy in order to distribute client requests among the instances of the application.

In a present embodiment of the invention, information reflecting the status or operation of application instances 104a, 104b and 104c (and/or servers 110, 112 and 114) is collected and analyzed on a regular or periodic basis. The information that is collected is identified in a load balancing policy that identifies one or more factors or pieces of information to be used to identify a "preferred" server to which client requests for application 104 are to be routed. Different policies thus require different information to be collected from the application instances, and the active policy can be changed during load balancing.

The various pieces of information that may be collected illustratively include data such as: whether a server or instance of application 104 is operational; the response time for a request submitted to a server or application instance; the number of requests processed by or pending on a server or application instance, a server's proximity to the central server (e.g., the number of network hops necessary to reach the server), etc.

In one embodiment of the invention, status objects are generated or produced to collect application-specific data from the application instances. The status objects may be constructed according to a standard API for a present load-balancing framework. Status objects and the load-balancing framework are described in detail below with reference to FIG. 2. In one particular embodiment, status objects (and other objects within the load-balancing framework) are designed (e.g., an object class is constructed) according to the standard API in a generation stage. Then, in a registration stage, individual objects are instantiated from the class(es). Finally, in a monitoring stage, the objects begin collecting information.

In the illustrated embodiment of the invention, status objects periodically interact with instances of application 104 to collect application-specific statistics that will be used to select a preferred server. For example, if application 104 were a DBMS, a status object may gather the number of database accesses, the number of requests received or pending, etc. for one instance of the application. As another example, if application 104 were an electronic mail program, a status object may periodically gather the number of inbound and/or outbound messages in queue, the number and size of mailboxes, etc.

Besides status objects, other computer-readable instructions (e.g., in the form of objects, agents or modules) are also executed (also described below) to collect, assemble and analyze the various pieces of information provided by the status objects and to update lookup table 102. The objects or agents within a load balancing framework may be created in a suitable programming or script language and then configured and installed on each of servers 110, 112 and 114 and/or on central server 100.

In an alternative embodiment of the invention, instead of returning an address of a server in response to a request for application 104, the lookup table returns an identifier (e.g., file name) of a set of instructions. The instructions are executed, illustratively by central server 100, in order to perform a variety of actions (e.g., load or mount an alternate Internet or domain namespace).

Figure 2:
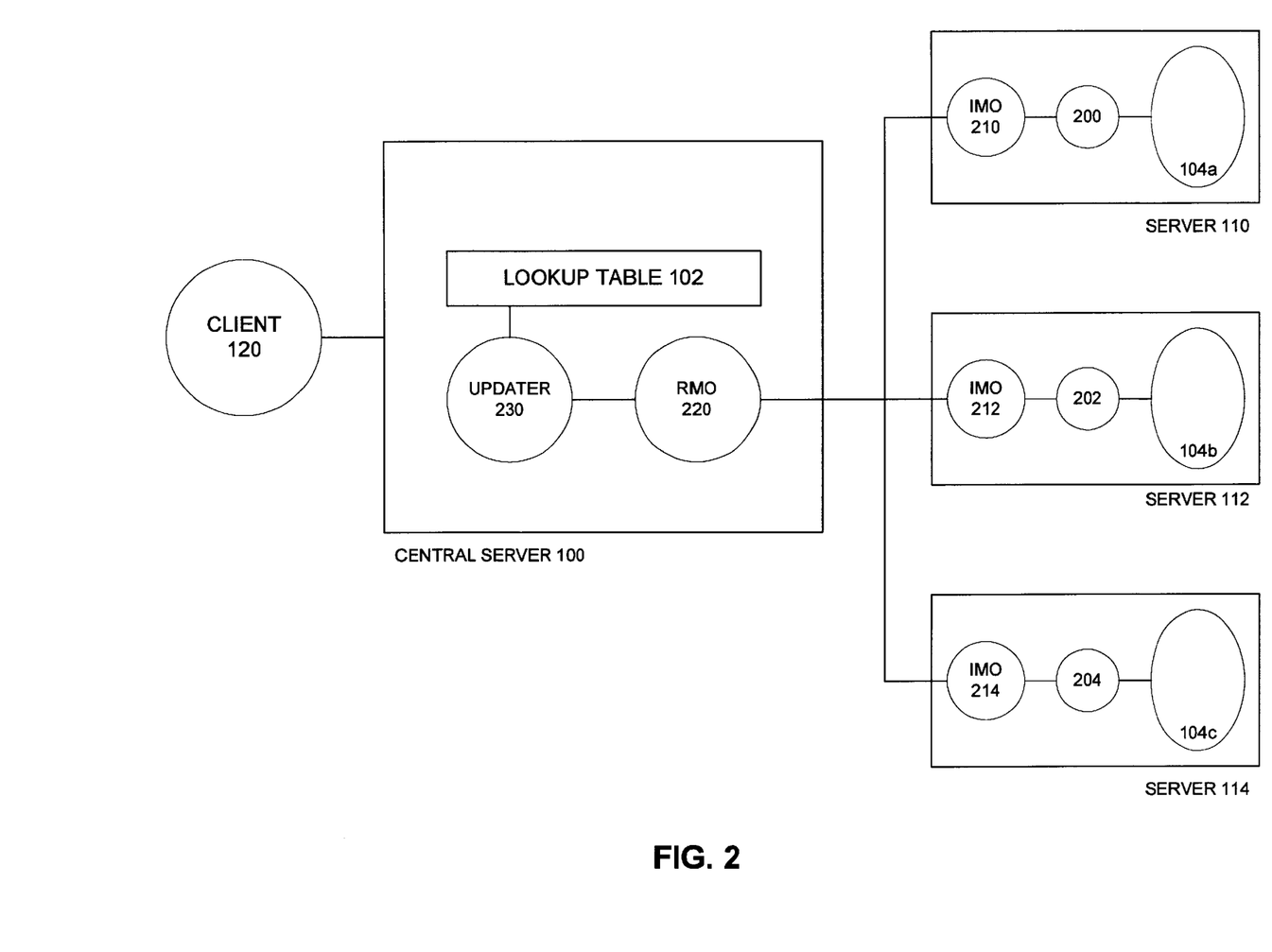
FIG. 2 is a block diagram depicting a method of balancing client requests among application instances in accordance with an embodiment of the present invention.

FIG. 2 depicts an illustrative embodiment of the invention in which operational and statistical information is collected from application instances 104a, 104b and 104c on servers 110, 112 and 114, respectively. The collected information is analyzed on central server 100 to choose a preferred server, and lookup table 102 is then modified to reflect an identity (e.g., a network address) of the preferred server.

In the illustrated embodiment, application instances 104a, 104b and 104c include application-specific information that is to be considered in choosing the preferred server. Status objects 200, 202 and 204 therefore execute on servers 110, 112 and 114, respectively, to gather the information or statistics from their associated application instances. The status objects advantageously adhere to the format provided by a standard API, concerning the manner in which the information is to be communicated to the central server. In particular, the status objects are designed to accumulate, store and/or provide application-specific data for retrieval by individual monitor objects 210, 212 and 214, which also execute on servers 110, 112 and 114, respectively.

The configuration of the status objects (e.g., the data they collect) depends upon the policy that has been selected for choosing a preferred server. For example, where the selected policy requires choosing the least-loaded server (e.g., the server having the least-loaded instance of the application), a status object may be configured to retrieve the number of pending client requests or number of connected clients. As another example, status objects 200, 202 and 204 may be configured to retrieve a response time or throughput of their associated application instances.

In addition, status objects are configured to retrieve their specified information on a periodic basis. If a status object fails to gather its information, it may be assumed that the associated application instance is not operational. If an application instance may be to be down, the associated server is removed from consideration as the preferred server for that application.

Illustratively, status objects 200, 202 and 204 communicate with or access application instances 104a, 104b and 104c in accordance with an application-specific API. Each status object also illustratively performs a single function or retrieves a single piece of application-specific information. In alternative embodiments of the invention, however, a single status object may perform multiple functions or produce multiple pieces of information. For example, in one alternative embodiment, a status object may retrieve multiple pieces of information concerning an application instance's load (e.g., number of connected clients, number of pending requests). The multiple pieces of information may then be combined (e.g., via a specified formula or function) to produce a single value or representation of the instance's load.

In FIG. 2, individual monitor objects (IMO) 210, 212 and 214 reside and execute on servers 110, 112 and 114. Individual monitor objects are known as server monitor objects in one embodiment of the invention. A separate IMO is depicted for each application instance. In particular, IMOs 210, 212 and 214 collect information from status objects 200, 202 and 204 respectively.

In one embodiment of the invention, a status object collects the specified application-specific information and stores it on its host server for collection by the associated IMO. In another embodiment of the invention, status objects interface with and directly communicate the information to their associated IMOs.

In the embodiment illustrated in FIG. 2, different types of status objects are executed or invoked with differing degrees of regularity. When the status objects collect the application instances' response times, for example, status object 200 may execute relatively frequently (e.g., every 60 seconds). In contrast, when the status objects reflect a policy preferring the closest server, status object 202 may execute only occasionally (e.g., once per day) because the distance from central server 100 to server 112 is unlikely to change very often.

Although each IMO is associated with only one status object and one application instance in the illustrated embodiment, in an alternative embodiment of the invention an IMO may collect data from multiple status objects. In this alternative embodiment, for example, an IMO may interface with one status object to determine the response time of an application instance or server and another status object to determine the load on the instance or server.

Replicated monitor object (RMO) 220 retrieves the collected information produced from each IMO associated with an application. Therefore, in the illustrated embodiment where each of servers 110, 112 and 114 operate a separate instance of a load-balanced application, RMO 220 collects data from IMOs 210, 212 and 214. If the servers also offered another load-balanced application or replicated service, a second RMO may operate on central server 100 for the purpose of retrieving information concerning that application from a different set of IMOs. A replicated monitor object may also be known as a central monitor object due to its coordination role on behalf of a central server that receives multiple requests for an application.

Various means of communication may be employed between an RMO and the IMOs associated with a particular application. In a present embodiment of the invention Object Request Broker (ORB) technology is employed. In an alternative embodiment of the invention Remote Procedure Call (RPC) technology can be used.

In summary, when load balancing is performed in accordance with the embodiments of the invention described above, a status object gathers load and/or operational information for an instance of the application being load-balanced. An IMO interfaces with or otherwise retrieves the information from each status object and an RMO gathers the information from all application instances from the IMOs.

The data collected by RMO 220 from the various IMOs is analyzed in accordance with the selected policy and a preferred server is identified. Illustratively, updater object 230 performs the analysis and selection of a preferred server. As discussed above, the preferred server may, for example, be the one having the application instance with the fastest response time, the fewest pending client requests, the greatest capacity for client requests, etc. Illustratively, RMO 220 maintains a data structure (e.g., array, vector, table, database) identifying each application instance and/or server that is being load-balanced, along with one or more values or other indicators or summaries of the collected information concerning each application instance.

Finally, updater object 230 updates lookup table 102 after the collected information is analyzed and a preferred server is selected. Illustratively, one updater object is used to update the lookup table for all applications being load-balanced. However, in an alternative embodiment of the invention separate updater objects may be employed for each application.

In the embodiment of the invention depicted in FIG. 2, RMO 220 retrieves the collected data and updater object 230 updates the lookup table on a periodic basis. The identity of the preferred server may thus change over time so that the client requests are distributed among all active application instances.

The status objects, IMOs, RMO and updater object may be considered to comprise a load-balancing framework for distributing client requests among various instances of an application. As one skilled in the art will recognize, the different objects within the framework may be distributed among the servers hosting application instances, a central server, and other entities such as intermediate servers.

Figure 3:
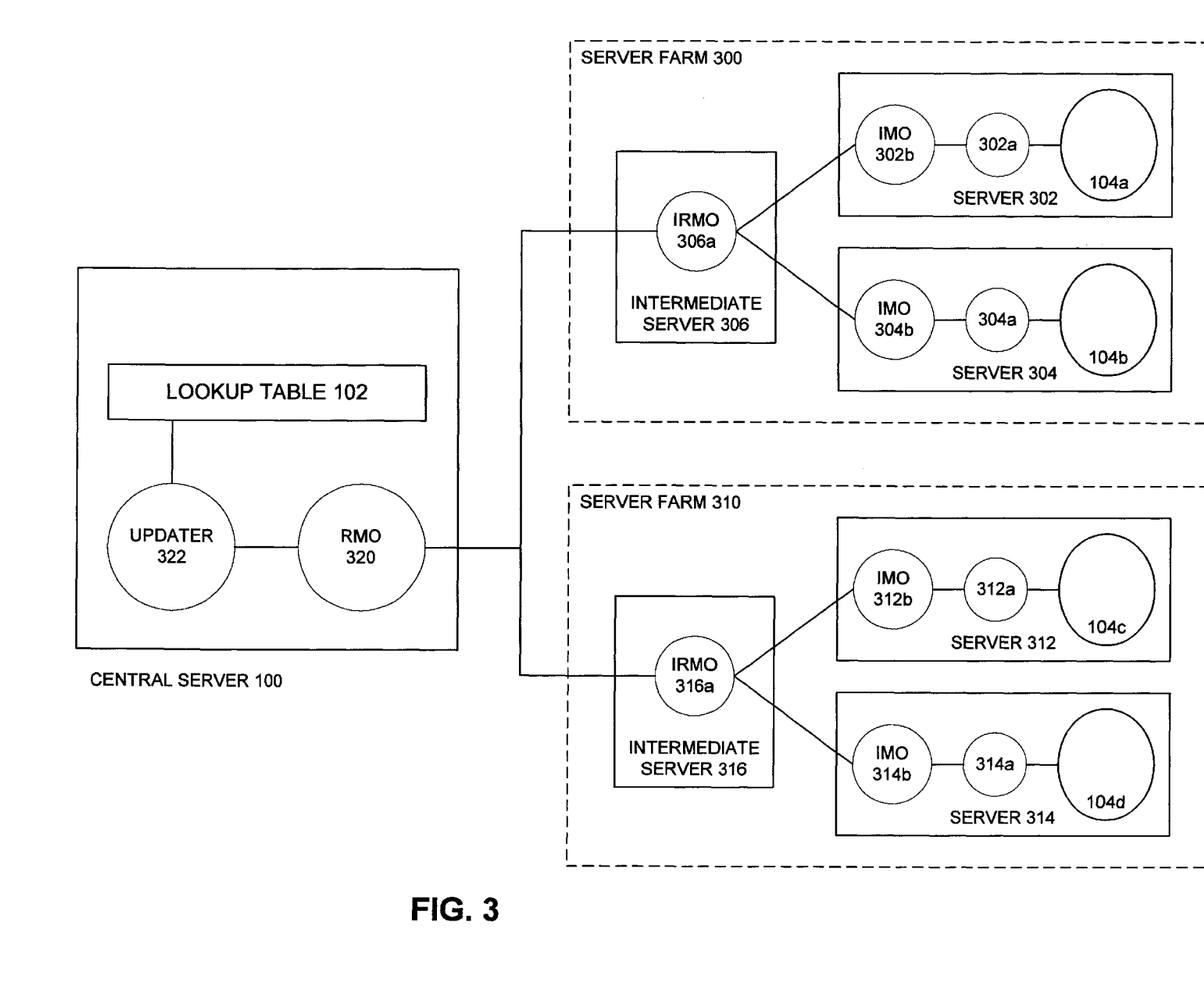
FIG. 3 is a block diagram depicting a method of balancing client requests among geographically dispersed application instances in accordance with an embodiment of the present invention.

FIG. 3 depicts an alternative embodiment of the invention in which servers offering an application are geographically dispersed. In FIG. 3, server farm 300 represents a first collection of servers offering the application (e.g., application instances 104a and 104b) and server farm 310 represents a second collection of servers offering the same application (e.g., application instances 104c and 104d). Although server farms are depicted in FIG. 3 with multiple members (i.e., servers 302 and 304 in server farm 300 and servers 312 and 314 in server farm 310), a server farm may consist of any number of members, even one.

Each server farm in the presently described embodiment includes an intermediate server (i.e., server 306 in server farm 300 and server 316 in server farm 310). One function of an intermediate server in this embodiment is to collect, from the servers in the farm that host instances of the load-balanced application information necessary to select a preferred server. For example, intermediate replicated monitor object (IRMO) 306a is operated on intermediate server 306 to collect data from servers 302 and 304. IRMO 306a operates similarly to the RMO described above in conjunction with to FIG. 2, but in this embodiment is located on a server situated between central server 100 and the servers offering the application. The load balancing framework of the illustrated embodiment also includes status objects (e.g., depicted by numerals 302a, 304a, 312a and 314a) and IMOs (e.g., depicted by numerals 302b, 304b, 312b and 314b) operating on servers 302, 304, 312 and 314.

RMO 320 operates on central server 100 to collect data from the IRMOs within each server farm. Updater object 322 updates lookup table 102 to reflect the preferred server identified from the data collected by RMO 320.

In an alternative embodiment of the invention in which an application is offered on multiple servers, one or more of which are local and one or more of which are remote, aspects of the embodiments of the invention depicted in FIGS. 2 and 3 are combined. In this alternative embodiment, intermediate servers with IRMOs are employed in server farms comprising the remote servers, in order to pass data between the remote servers' IMOs and an RMO, as in the embodiment depicted in FIG. 3. Local servers, however, employ IMOs that communicate with the RMO without an intervening IRMO, as in FIG. 2.

In another alternative embodiment of the invention, load balancing among instances of an application is performed among multiple participating servers wherein one or more of the servers are segregated (e.g., situated in a remote location and/or within a server farm). Within the group of segregated servers, a "local" load balancing policy may be implemented for distributing all client requests sent to the group and/or to a specific member of the group. In this alternative embodiment, the segregated servers may be considered a single entity for the purposes of a "global" load balancing policy specifying the manner in which client requests for the application are to be distributed among participating servers. The global and local policies need not be equivalent (e.g., the global policy may require selection of the closest server (or group of servers) while the local policy may require the least-loaded server or application instance).

Figure 4:
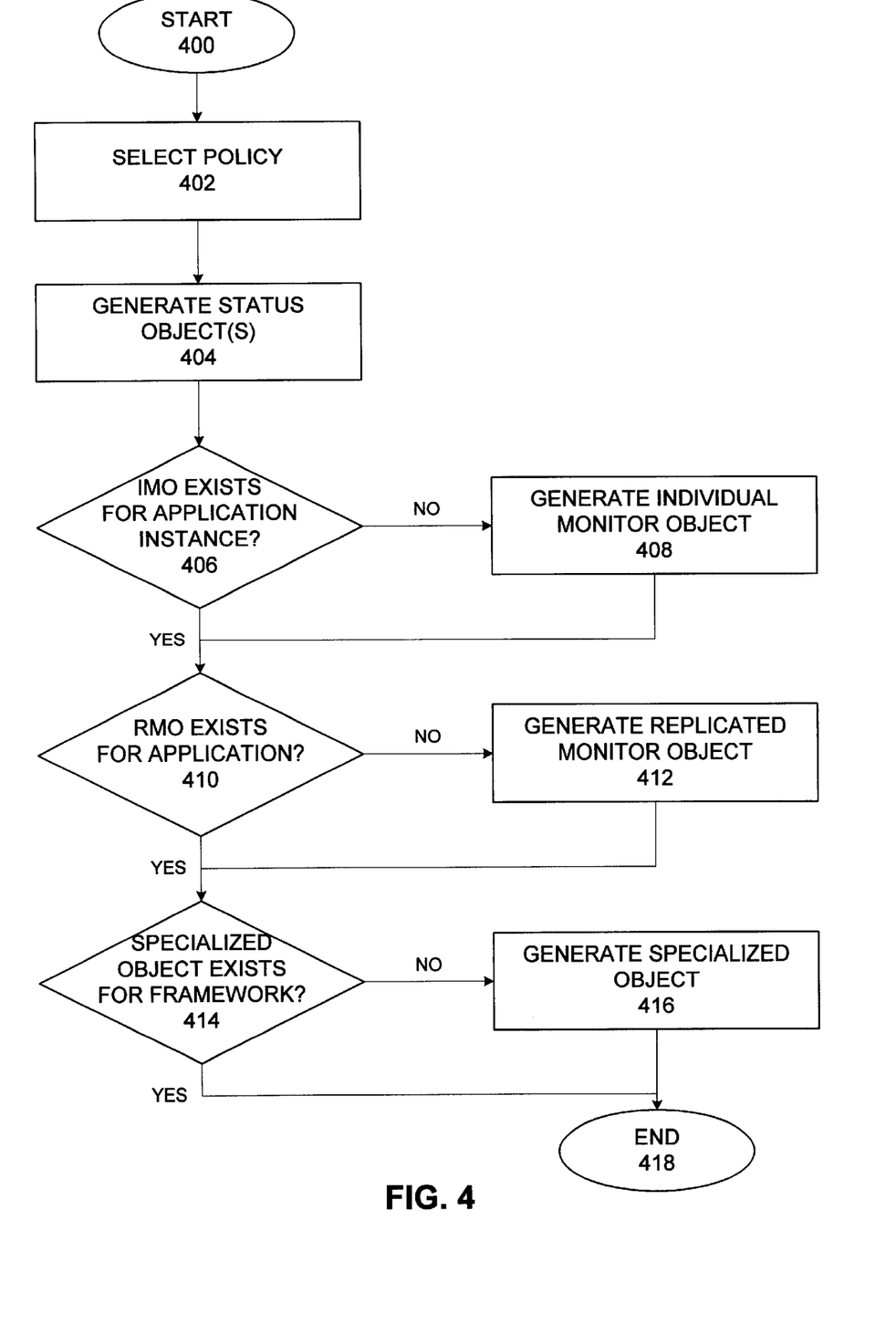
FIG. 4 is a flow chart demonstrating the generation of objects in a load-balancing framework in accordance with an embodiment of the present invention.
Figure 5:
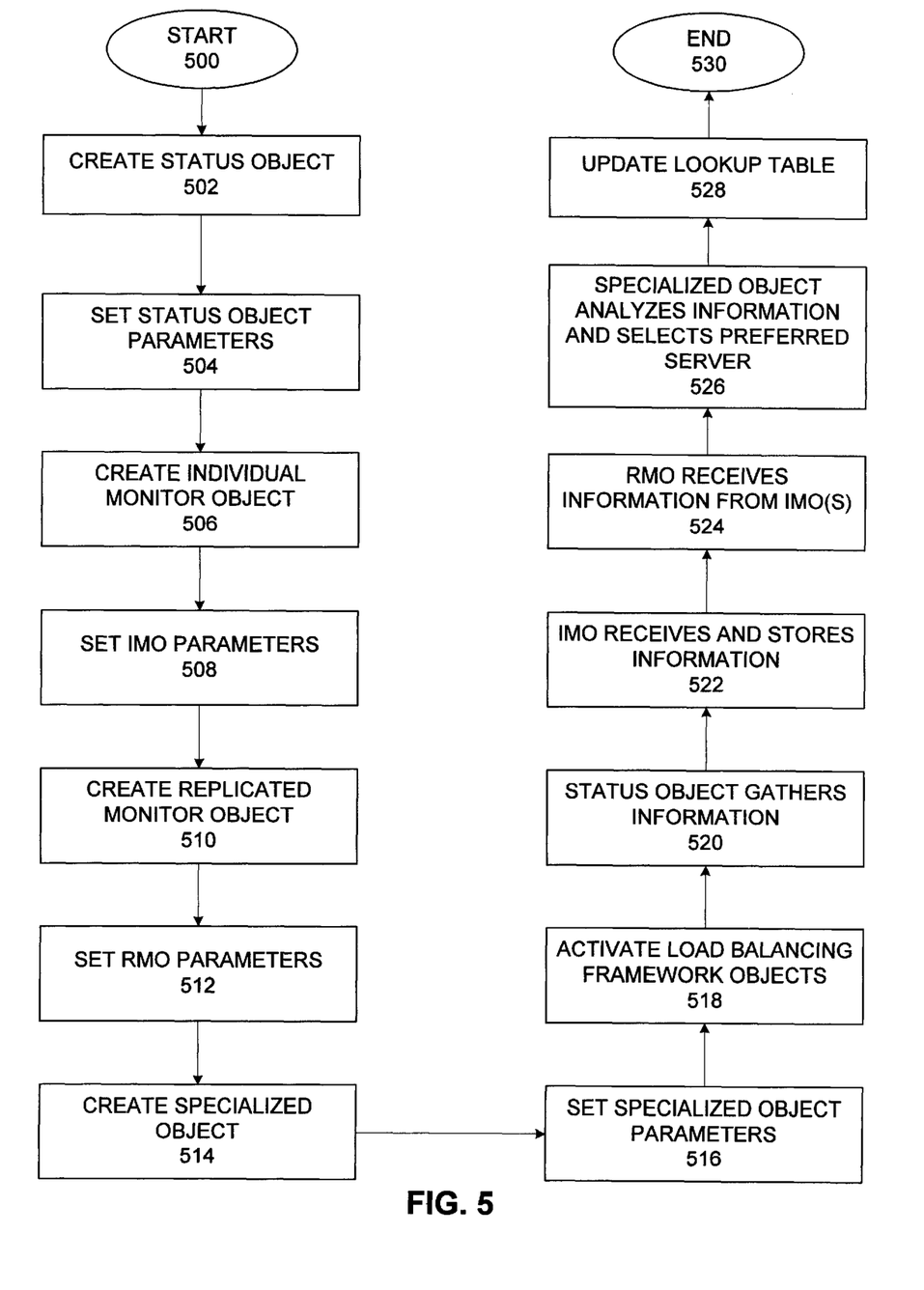
FIG. 5 is a flow chart demonstrating the registration of objects within a load balancing framework and their use in monitoring an instance of a load-balanced application in accordance with an embodiment of the present invention.

With reference now to FIGS. 4 and 5, an illustrative method of load balancing between multiple instances of an application is depicted. In the illustrated method, a central server (e.g., a DNS Server) resolves client requests for a virtual name by which the application is known into an identifier of a preferred server offering an instance of the application. Each instance of the application illustratively operates on a separate server and is modified to produce application-specific information needed to choose the preferred server.

FIG. 4 demonstrates an illustrative generation stage of the method, in which objects in the load-balancing framework are designed (e.g., object classes are constructed). FIG. 5 demonstrates illustrative registration and monitoring stages, in which individual objects are created (e.g., instantiated) and begin collecting information from instances of the load-balanced application.

With reference now to FIG. 4, state 400 is a start state. In state 402 a policy to be applied to identify a preferred server is selected. One skilled in the art will appreciate that various policies are possible, depending upon the nature of the application and the aspect(s) of the application that are conducive to load balancing.

Illustrative policies in a present embodiment of the invention focus upon the status or availability of the various instances of the application. Such policies reflect preferences for the least loaded instance, the instance with the fastest response time or throughput, the instance with the fewest connected clients, etc. For example, where access requests for a database management system (DBMS) are load balanced, illustrative policies may include routing requests to the server on which the fewest DBMS requests have been processed or the server having the fewest connected users or the fewest unfulfilled processing or access requests. For each application for which requests are load-balanced, separate policies may be employed.

In an alternative embodiment of the invention, policies require examination of the availability or status of the servers offering instances of the application. Such policies may express preferences for the server having the shortest distance to the central server, the fastest response time, the best throughput, etc.

In general, the selected policy reflects whichever aspect or aspects of the load-balanced application form the basis for distributing client requests among the various instances of the application and/or the servers hosting the application instances. The information reflecting these aspects is periodically captured for each instance by status objects working in close cooperation with the application instances.

In state 404, sequences of instructions or executable code are produced for performing the function(s) of the status objects (i.e., to collect the application-specific information needed to choose a preferred server). In one embodiment of the invention in which the load balancing framework is constructed using an object-oriented programming language, a compatible language and basic building blocks provided by the framework are used to generate the status objects, IMOs, RMO and specialized object. Thus, in this embodiment of the invention state 404 comprises the creation of one or more classes of status objects, from which individual instances will be created in the registration stage depicted in FIG. 5. Illustratively, status objects are substantially similar for each instance of a load-balanced application.

Status objects may be configured to store the information for retrieval by individual monitor objects or, alternatively, to interface with the IMOs directly in order to pass the information along. In addition, the status objects may be configured to execute automatically on a regular basis, in response to action by another part of the load balancing framework (e.g., upon invocation by an IMO), the application or some other external entity, etc.

As discussed above, in a current embodiment of the invention status objects (and other framework objects) are constructed using an object-oriented programming language. One skilled in the art will recognize that many suitable programming languages and tools exist and that the invention may be implemented using techniques other than object-oriented programming. Illustratively, however, status objects substantially adhere to a common format (e.g., detailed in a load balancing framework API) in order to cooperate with the overall load balancing framework.

In state 406, the existing load-balancing framework is examined to determine whether an IMO (e.g., an IMO class) already exists for collecting data concerning an instance of the load-balanced application. If an IMO already exists, the illustrated method continues at state 410. Otherwise, in state 408 an IMO structure (e.g., an object class) is constructed that is specific to the application instance. The IMO is designed such that it will collect the various data and statistics gathered by one or more status object(s). In an alternative embodiment of the invention, the IMOs generated for all instances of a particular application are substantially similar.

In state 410, the existing load balancing framework is examined to determine whether an RMO already exists for receiving data from the IMOs that are associated with each instance of the application. As described above, in one embodiment of the invention an RMO comprises a data structure for retaining application-specific information from the application instances. If an RMO already exists, the illustrated method continues at state 414. Otherwise, in state 412, an RMO structure (e.g., an object class) is constructed that is specific to the application. As with the status objects and IMOs, an actual RMO instance will be created as part of the registration stage depicted in FIG. 5.

In state 414, the existing load balancing framework is examined once more. This time, it is determined if the sequence of instructions or executable code for the specialized object that will determine a preferred server already exists. If not, in state 416 a specialized object structure (e.g., an object class) is constructed to apply the selected load balancing policy to the results of the data collected concerning the various application instances (and/or their host servers) and select a preferred server. The specialized object is also designed to update the lookup table (or other data structure) to store an identity of the preferred server.

The generation stage of the illustrated method then ends with end state 418.

With reference now to FIG. 5, illustrative registration and monitoring stages of the illustrated method are depicted. For present purposes, the term registration refers to the registration of individual objects (e.g., status object, IMO, RMO, specialized object) within a load balancing framework, including their creation (e.g., instantiation) from the object structures (e.g., classes) produced in the generation stage depicted in FIG. 4. In the monitoring stage, information is collected for the purpose of identifying a preferred server in accordance with a selected load balancing policy. In FIG. 5, state 500 is a start state.

In state 502, a status object is registered with the load-balancing framework. In one embodiment of the invention, the standard API provided with the load balancing framework includes a command (e.g., "create") for creating an instance of each object within the framework. As one skilled in the art will appreciate, creating an instance of an object, such as a status object, involves the dynamic loading and executing of a sequence of instructions defining the object.

In state 504, configurable parameters of the status object are set in accordance with the selected policy. Illustrative parameters include the frequency with which the application-specific information should be gathered, a network or port address for communicating with the application instance, information detailing how to communicate with the application instance and/or IMO, etc. One skilled in the art will appreciate that a status object may have a variety of configurable parameters, depending upon the nature of the application and the selected policy.

In state 506, an individual monitor object (IMO) is registered with the load-balancing framework. Illustratively, one IMO is registered or created for each instance of the application. Each IMO may be installed on the server executing the associated instance of the application. In an alternative embodiment, however, IMOs operate on the central server or an intermediate server located between the central server and the host servers. As described above, IMOs may be configured to collect and report certain information or data. In the presently described embodiment of the invention, the collected information is received directly from a status object. In an alternate embodiment of the invention, the information may be retrieved from a location in which it was placed by the status object (e.g., a storage device, a file or other data structure).

As described above, the information to be collected may be determined by the selected load balancing policy, and will be used to identify a preferred server. In a present embodiment of the invention, the active policy for an application may be changed without disrupting the handling of client requests. Illustratively, this is done by temporarily pausing the operation of IMOs for the application, installing new status objects reflecting the new policy, then resuming the IMOs. Advantageously, the IMOs need not be altered or replaced.

In state 508, parameters are set for the IMO created in state 506. Illustrative parameters include a list of status objects from which to collect information, the frequency with which to collect the information, how to communicate with the status objects and/or RMO, etc.

In state 510 a replicated monitor object is created for the load balanced application. As described above, the RMO may be installed on the central server and communicates with the IMOs using a suitable format or protocol (e.g., ORB or RPC). In an alternative embodiment in which intermediate servers are employed (e.g., where remote servers or server farms are included), an intermediate RMO is created for each intermediate server. In state 512, RMO parameters are set, possibly including a list of IMOs, the frequency with which data is to be collected from the IMOs, a method of communicating with the IMOs, etc.

A back-end or host server (e.g., server 110 from FIG. 1) may be removed from or added to the load-balancing scheme without significantly disrupting operation of the application. A host server may, for example, become inoperative or require replacement. Illustratively, each RMO maintains an index (e.g., in an array, linked list, vector, other data structure, etc.) of all servers participating in the load balancing (e.g., all servers offering an instance of the application). This information may, for example, be included in a list of IMOs from which the RMO receives information. By temporarily pausing the RMO, removing the IMO associated with the server from the list and restarting the RMO, the RMO will stop attempting to retrieve information for the removed server (i.e., the RMO will no longer communicate with the IMO associated with the server). Servers may be added to the load-balancing scheme in a similar manner.

In state 514, a specialized object is registered with the load-balancing framework (e.g., created from its object class). In state 516, parameters concerning the operation of the specialized object are set. Illustrative parameters include an identity of the RMO, the frequency of information retrieval from the RMO, an identity of the lookup table, method of interfacing with the RMO and/or lookup table, etc. In one embodiment of the invention, the specialized object analyzes the information collected from the servers hosting the application instances, identifies a preferred server in accordance with the load-balancing framework and updates the lookup table.

Where, for example, the application comprises web browsing on web servers, the specialized object may take the form of a DNS updater configured on a DNS server to modify a DNS zone file to identify the server to which requests are to be routed. Similarly, where load balancing is being performed for an application operating in a master/slave relationship (e.g., a master process or server routes requests to slave processes or servers), the specialized object updates a data structure or entry indicating a preferred process or server.

After the various executable objects or program modules are configured and installed in states 502–516, the collection of server/application information can begin. Thus, in state 518 the created objects (e.g., status objects, IMOs, RMO and specialized object) are activated or executed if they are not already executing.

In state 520, a status object begins collecting or gathering information from its application instance. For example, where the selected policy favors the least-loaded application instance, a status object retrieves data concerning an instance's load (e.g., number of client requests or connected clients).

In state 522 an IMO retrieves the information gathered by its associated status object(s). Then, in state 524, an RMO calls, invokes or otherwise communicates with the IMO to retrieve the information. The RMO may similarly communicate with additional IMOs storing information concerning other servers or instances of the application. Illustratively, the RMO executes on the central server and stores the information retrieved from the IMOs for analysis by the specialized object.

In state 526 the information collected by the RMO is analyzed in accordance with the selected policy to choose a preferred server. In state 528 the specialized object updates the lookup table for the central server to indicate the preferred server. Illustratively, the update procedure comprises associating an alias or network address of the preferred server with the name of a virtual server/service through which clients access the application. In addition, in a present embodiment of the invention the central server is signaled to reload the lookup table. State 530 is an end state.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

In one alternative embodiment of the invention, for example, clients access an instance of the application program directly (i.e., rather than connecting through a central server). In this alternative embodiment, the program instances exchange information (e.g., via status objects and/or other elements of a load-balancing framework) and redirect client requests as necessary to balance the requests in accordance with the selected policy.

In another alternative embodiment of the invention, one or more elements of a load-balancing framework are combined. By way of illustration, an RMO may be designed to perform the functions of an IMO and collect information from one or more status objects.

What is claimed is:

1. A method of distributing requests for an application among a plurality of application instances operating on a plurality of servers, wherein the requests are received at a central server, the method comprising:

selecting a policy, said policy demonstrating a first server-selection factor for selecting a preferred server to receive a request for the application;

executing a first status module to determine a first status of said first server-selection factor for a first instance of the application;

executing a second status module to determine a second status of said first server-selection factor for a second instance of the application;

receiving said first status at the central server;
receiving said second status at the central server;
examining said first status and said second status to select a preferred server; and
storing an identifier of said preferred server on the central server;
wherein said first server-selection factor comprises an application-specific detail.

2. The method of claim 1, further comprising operating a server monitor module to receive said first status of said first server-selection factor from said first status module.

3. The method of claim 2, wherein said operating a server monitor module comprises receiving a first status of a second server-selection factor from a third status module.

4. The method of claim 2, wherein said server monitor module executes on said first server.

5. The method of claim 2, wherein said server monitor module executes on the central server.

6. The method of claim 1, further comprising executing a third status module to determine a first status of a second server-selection factor for said first instance of the application.

7. The method of claim 6, wherein said first status module comprises said third status module.

8. The method of claim 1, further comprising operating a central monitor module for receiving said first status and said second status.

9. The method of claim 8, wherein said central monitor module executes on the central server.

10. The method of claim 1, wherein said executing a first status module comprises operating a first status module residing on the first server.

11. The method of claim 1, wherein said executing a first status module comprises communicating with a first instance of the application to determine a first status of said first server-selection factor.

12. The method of claim 1, further comprising:
selecting a local policy for a subset of the plurality of servers, said local policy specifying a local server-selection factor for selecting a server to receive a request for the application.

13. The method of claim 1, wherein said application-specific detail comprises one of the set of: number of accesses to the application, number of requests for access to the application, number of electronic mail messages, size of electronic mailbox, number of electronic mailboxes.

14. A method of load balancing requests for an application received at a central server among a set of servers, wherein each server in the set of servers operates an instance of the application, comprising:
selecting a policy for directing a request for the application to a preferred server, wherein said policy reflects a server factor for selecting said preferred server from the set of servers;
configuring a first status object to determine a first status of said server factor for a first instance of the application;
configuring a first server monitor object to receive said first status;
configuring a central monitor object to receive multiple statuses of said server factor for multiple instances of the application, including said first status;
examining said multiple statuses to select a preferred server; and
updating the central server to identify said preferred server;
wherein said server factor comprises a performance indicator specific to the application.

15. The method of claim 14, further comprising:
executing said first status object, wherein said first status object resides on said first server;
receiving said first status by said first server monitor object; and
receiving said first status at the central server, by said central monitor object, from said first server monitor object.

16. The method of claim 15, wherein said executing said first status object comprises operating said first status object to periodically determine a status of said server factor for a first instance of the application.

17. The method of claim 15, further comprising maintaining said first server monitor object on said first server.

18. The method of claim 14, wherein the set of servers includes a subset, the method further comprising:
configuring an intermediate central monitor object to collect one or more statuses of said server factor for one or more members of the subset; and
receiving said one or more statuses at the central server from said intermediate central monitor object.

19. The method of claim 18, further comprising selecting a local policy for balancing requests for the application among members of the subset according to a local server factor.

20. The method of claim 19, wherein said local server policy is different from said policy.

21. The method of claim 14, further comprising:
executing said first status object, wherein said first status object resides on said central server; and
maintaining said server monitor object on the central server.

22. The method of claim 21, wherein said executing said first status object comprises operating said first status object to periodically determine a status of said server factor for a first instance of the application.

23. The method of claim 14, wherein said central server comprises a lookup table to associate said preferred server with the application, and wherein said updating comprises storing an address of said preferred server.

24. A method of distributing requests for an application among a plurality of application instances operating on a plurality of servers, the method comprising:
selecting a policy for identifying a preferred server to receive a request for the application, said policy including a first server-selection factor;
determining a status of said first server-selection factor for one or more instances of the application;
storing an identifier of a preferred server on a central server; and
directing a request for the application received after said storing to said preferred server;
wherein said first server-selection factor comprises a performance indicator specific to the application.

25. The method of claim 24, wherein said storing comprises:
examining said status of said first server-selection factor for said one or more instances of the application; and
selecting a preferred server on the basis of said examination, said preferred server being associated with one of said one or more instances of the application.

26. The method of claim 25, wherein said examining and said selecting are performed on said central server.

27. The method of claim 24, wherein said determining comprises executing a first status module to retrieve a first status of said first server-selection factor for a first instance of the application.

28. The method of claim 27, wherein said first status module is executed on a server operating said first instance of the application.

29. An apparatus for balancing requests for an application among multiple servers operating multiple instances of the application, wherein the requests are received at a central server, comprising:
- a first server for operating a first instance of the application;
- a second server for operating a second instance of the application;
- a first status module for determining a first application-specific status of said first instance;
- a second status module for determining a second application-specific status of said second instance;
- a first server monitor module for receiving said first application-specific status from said first status module;
- a second server monitor module for receiving said second application-specific status from said second status module;
- a central monitor module for receiving said first application-specific status and said second application-specific status; and
- an update module for updating the central server to indicate one of said first server and said second server to receive a request for the application.

30. The apparatus of claim 29, wherein said first status module resides on said first server.

31. The apparatus of claim 29, wherein said first status module determines said first application-specific status by receiving said first status from said first instance.

32. The apparatus of claim 29, wherein said first server monitor module operates on said first server.

33. The apparatus of claim 29, wherein said first server monitor module operates on the central server.

34. The apparatus of claim 29, wherein the central server comprises said central monitor module and said update module.

35. The apparatus of claim 29, further comprising a server farm, said server farm comprising:
- one or more servers; and
- an intermediate central monitor module for receiving a status of an instance of the application operating on one of said one or more servers and communicating said status to said central monitor module.

36. An apparatus for load balancing requests for an application received at a central server, comprising:
- a first status determination means for determining a first application-specific status of a first instance of the application;
- a second status determination means for determining a second application-specific status of a second instance of the application;
- central monitor means for receiving said first application-specific status and said second application-specific status;
- server selection means for selecting a preferred server from one of said first server and said second server; and
- updating means for storing an identifier of said preferred server on the central server.

37. The apparatus of claim 36, further comprising a first server monitor means for receiving said first application-specific status from said first status determination means.

38. A computer readable storage medium storing instructions that, when executed by a computer, cause the computer to perform a method for balancing requests for an application among a plurality of servers, wherein the requests are received at a central server, the method comprising:
- selecting a policy for directing a request for the application to a preferred server, wherein said policy reflects a server factor for selecting said preferred server from the set of servers;
- configuring a first status object to determine a first status of said server factor for a first instance of the application;
- configuring a first server monitor object to receive said first status;
- configuring a central monitor object to receive multiple statuses of said server factor for multiple instances of the application, including said first status;
- examining said multiple statuses to select a preferred server; and
- updating the central server to identify said preferred server;
- wherein said first server-selection factor comprises an application-specific detail.

39. A method of load-balancing multiple requests for an application, wherein instances of the application execute on a plurality of servers, the method comprising:
- receiving a client request for an application at a first server operating a first instance of the application;
- executing a first status module on the first server, wherein said first status module is configured to determine a first status of the first instance;
- executing a server monitor module on the first server, wherein said server monitor module is configured to receive a first status of a second instance of the application operating on a second server;
- examining said first status of the first instance and said first status of the second instance to select a preferred server from among the plurality of servers; and
- routing the client request to said preferred server.

* * * * *